United States Patent
Wilcoxon

(10) Patent No.: US 7,026,826 B2
(45) Date of Patent: Apr. 11, 2006

(54) VECTOR SENSOR DEVICE AND CALIBRATION METHOD

(75) Inventor: Winfred C. Wilcoxon, Gaithersburg, MD (US)

(73) Assignee: Wilcoxon Research, Inc., Gaithersburg, MD (US)

( * ) Notice: Subject to any disclaimer, the term of this patent is extended or adjusted under 35 U.S.C. 154(b) by 38 days.

(21) Appl. No.: 10/443,735

(22) Filed: May 23, 2003

(65) Prior Publication Data

US 2004/0108858 A1 Jun. 10, 2004

Related U.S. Application Data

(60) Provisional application No. 60/382,583, filed on May 24, 2002.

(51) Int. Cl.
 *G01D 18/00* (2006.01)
 *G01R 35/00* (2006.01)
 *G01V 1/20* (2006.01)

(52) U.S. Cl. .................. 324/601; 367/154; 73/1.01

(58) Field of Classification Search ............. 324/601; 702/17; 367/154; 73/1.01
See application file for complete search history.

(56) References Cited

U.S. PATENT DOCUMENTS

| | | | | |
|---|---|---|---|---|
| 4,253,164 A | * | 2/1981 | Hall, Jr. .................... 367/22 |
| 4,345,473 A | * | 8/1982 | Berni ...................... 73/514.09 |
| 4,437,175 A | * | 3/1984 | Berni ........................ 367/24 |
| 4,536,862 A | | 8/1985 | Sullivan et al. ............. 367/153 |
| 5,007,696 A | * | 4/1991 | Thackara et al. .............. 385/2 |
| 5,853,005 A | * | 12/1998 | Scanlon ..................... 600/459 |
| 5,995,451 A | | 11/1999 | Evans et al. ................. 367/139 |
| 6,571,598 B1 | * | 6/2003 | Freehill et al. .............. 73/1.01 |
| 6,580,661 B1 | * | 6/2003 | Marschall et al. .......... 367/154 |
| 6,725,164 B1 | * | 4/2004 | Bednar ........................ 702/17 |

* cited by examiner

*Primary Examiner*—Anjan Deb
*Assistant Examiner*—John Teresinski
(74) *Attorney, Agent, or Firm*—Heller Ehrman LLP; Paul Davis

(57) ABSTRACT

A sensor includes a piezoelectric hydrophone and at least one accelerometer. In calibration mode, the hydrophone is connected to a source of a known electrical signal and outputs a mechanical/acoustic signal that the accelerometer detects. Comparison of the known electrical signal to the output of the accelerometer allows calibration of the accelerometer. In operation mode, both the hydrophone and the accelerometer are connected to a data acquisition unit.

9 Claims, 1 Drawing Sheet

FIG. 1
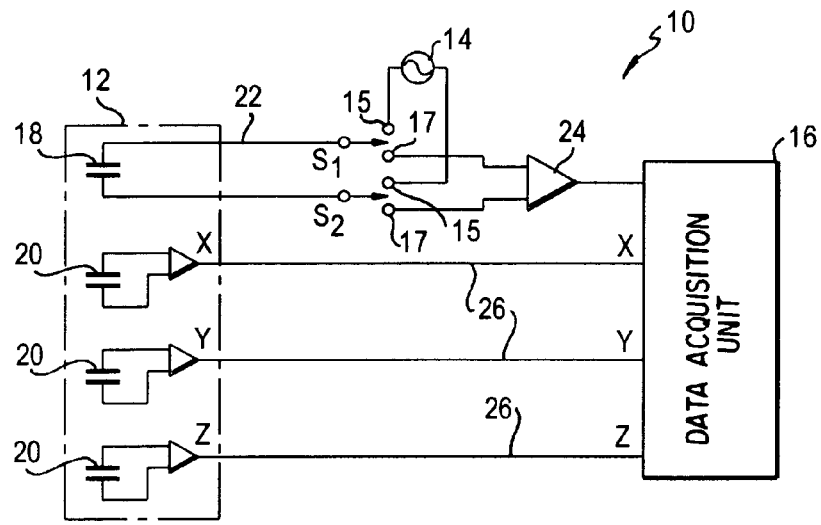
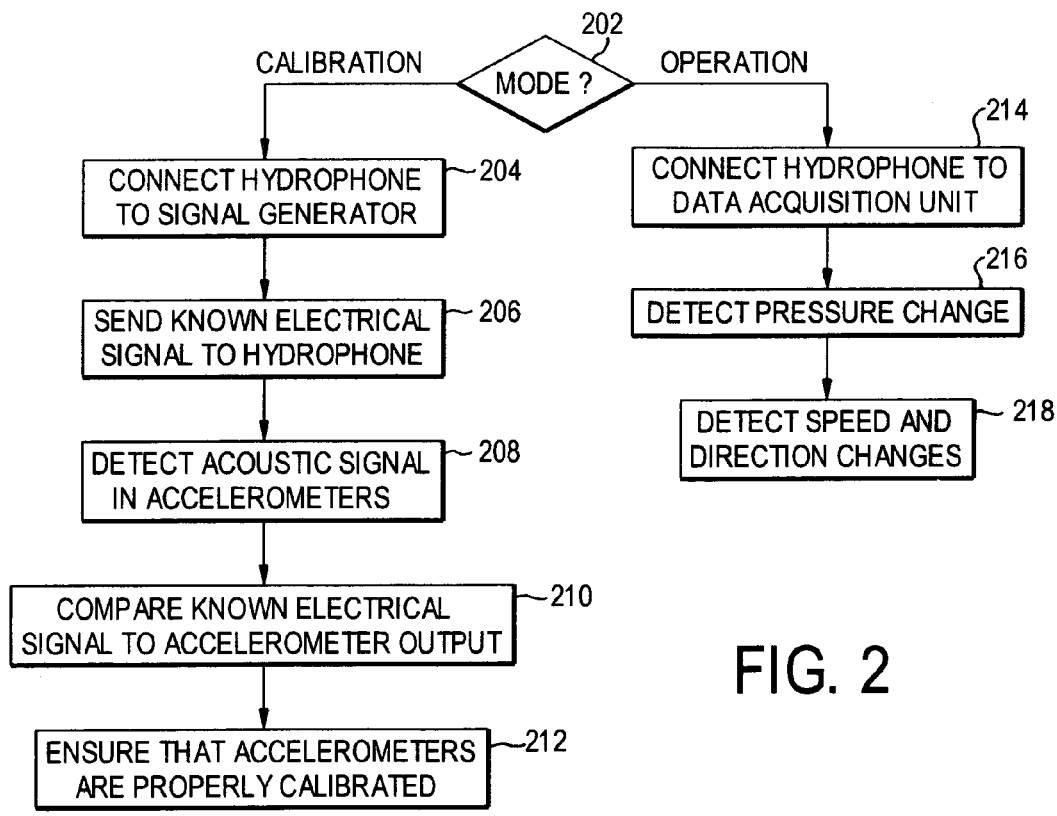
FIG. 2

VECTOR SENSOR DEVICE AND CALIBRATION METHOD

REFERENCE TO RELATED APPLICATION

The present application claims the benefit of U.S. Provisional Application No. 60/382,583, filed May 24, 2002, whose disclosure is hereby incorporated by reference in its entirety into the present disclosure.

FIELD OF INVENTION

The present invention is directed to a field or institute calibrated sensor system for detecting motion and pressure changes in, e.g., underwater environments to be used in activities such as geophysical exploration, depth detection and anti-submarine warfare.

BACKGROUND OF THE INVENTION

Acoustic sensors are used in underwater environments for a variety of purposes, such as geophysical exploration, depth detection and anti-submarine warfare. Because of the nature of the environment, these sensors often provide the only information on the physical conditions of the surroundings. Therefore, it is vital that the sensors be accurate and calibrated properly.

It is known in the art to use piezoelectric elements in acoustic sensors, particularly those in underwater environments. U.S. Pat. No. 4,536,862 to Sullivan discloses a sensor having piezo-electric elements attached to conductive plates. When external forces act on the sensor, the conductive plates and corresponding piezo-electric elements flex in response thereto, with the piezo-electric elements generating an electrical signal in relation to the applied force. However, Sullivan is silent on the manner in which the sensor is calibrated.

U.S. Pat. No. 5,995,451 to Evans et al. discloses an underwater sensor using piezo-electric elements and accelerometers. The reference discloses a first calibration method for the piezo-electric elements and the accelerometers that use a function generator, a speaker and a sound pressure level meter. A second calibration method places the sensor in a fluid stream with a known flow rate so that a calibration table can be produced. However, neither of those calibration methods can be implemented in a self-contained sensor or in the field.

The Sullivan reference fails to disclose a calibration method and the components that are needed to perform a calibration procedure. The Evans et al. reference discloses a calibration method, which in the first instance requires a speaker and a sound pressure level meter, and in the second instance requires the user to produce a calibration chart. The Evans et al. reference therefore requires several components for the calibration procedure, specifically the speaker and the sound pressure level meter, and it also requires that the calibration take place prior to deployment of the sensors.

SUMMARY OF THE INVENTION

Therefore, it is an object of the invention to have an underwater sensor system that is self-contained, field or institute calibrating, and made with a minimal number of components. It is a further object of the invention to have a sensor system that is able to calibrate itself after deployment, or that is capable of being calibrated in the field or in the institute and then monitoring and verifying its calibration To achieve the above and other objects, the sensor system of the present invention includes a sensor element attached to a signal generator and a data acquisition unit. The sensor element contains a piezo-electric hydrophone and at least one accelerometer which measure the pressure and motion changes, respectively, in underwater environments and sends the information to the data acquisition unit. In a preferred embodiment, the sensor includes three mutually orthogonal accelerometers for three-dimensional motion detection.

The sensor system is also able to calibrate itself by sending a known electrical signal from the signal generator to the hydrophone, which vibrates at a known frequency and level in response to the electrical signal, producing mechanical motion that emulates an acoustic signal that is picked up by the nearby accelerometers. The accelerometers transmit the information to the data acquisition unit which correlates the known input electrical signal with the accelerometer output signal to ensure that the accelerometers are properly calibrated.

The sensor system is self-contained and is able to calibrate itself without any external components or preliminary steps. In this way, the sensor system can calibrate itself after deployment into the field so that the accuracy of its readings is ensured.

BRIEF DESCRIPTION OF THE DRAWINGS

A preferred embodiment of the present invention will be set forth in detail with reference to the drawings, in which:

FIG. 1 shows a schematic of the sensor system of the present invention; and

FIG. 2 shows a flow chart of the calibration and operation modes of the sensor system of FIG. 1.

DETAILED DESCRIPTION OF THE PREFERRED EMBODIMENT

Referring now in detail to the drawings, FIG. 1 shows a sensor system 10 comprising a sensor element 12, a signal generator 14 and a data acquisition unit 16. The sensor system 10 has two modes, a first calibration mode that calibrates the sensor element 12, and a second operating mode that detects pressure and motion changes in underwater environments to be used for activities such as geophysical exploration, depth detection and anti-submarine warfare.

The sensor element 12 includes a high impedance crystal hydrophone 18 and three accelerometers 20 within the same housing and in close proximity to each other. The housing is any housing suitable for use with a hydrophone. The sensor 12 is mounted within the housing so as to permit the sensor to communicate with the surrounding water. Each accelerometer 20 measures the forces in a different axis, specifically, the x, y and z-axes. The hydrophone 18 contains a piezo-electric element that is able to detect the pressure changes in the surrounding environment.

The hydrophone 18 is attached to a first circuit 22 with a pair of switches S1 and S2 that move between the calibration mode and the operation mode. When in the calibration mode, the switches S1 and S2 are attached to nodes 15 to form a closed loop with the signal generator 14. In the operating mode, the switches S1 and S2 are attached to nodes 17 which are connected to the data acquisition unit 16 and by-pass the signal generator 14. A signal conditioning element 24, a pre-amplifier in the preferred embodiment, may be added between the hydrophone 18 and the data acquisition unit 16 to modify a signal from the hydrophone 18 before it is collected in the data acquisition unit 16. The accelerometers 20 are electrically connected to the data acquisition unit 16 by a second circuit 26 that runs parallel to the first circuit 22.

The calibration and operation of the sensor system 10 will now be described with reference to both FIG. 1 and FIG. 2. It is determined in step 202 whether the system 10 should be in the calibration mode or the operation mode. In the calibration mode, the switches S1 and S2 are attached in step 204 to nodes 15 to form a closed loop between the hydrophone 18 and the signal generator 14. The signal generator 14 sends a known electrical signal in step 206 to the hydrophone 18, causing the piezo-electric element to vibrate, producing a mechanical signal emulating an acoustic signal at a known level and frequency. The mechanical signal is detected in step 208 by the nearby accelerometers 20, which transmit an electrical output signal to the data acquisition unit 16. A computer, either in the data acquisition unit 16 or provided for separately, then compares the known input signal to the accelerometer output signal in step 210 to ensure in step 212 that the accelerometers 20 are operationally properly calibrated. The calibration can be implemented in any suitable way; for example, the comparison carried out in step 210 can be used to produce a calibration table.

In the operating mode, the switches S1 and S2 are attached in step 214 to nodes 17 and connect the hydrophone 18 to the data acquisition unit 16 and by-pass the signal generator 14. Both the hydrophone 18 and the accelerometers 20 are connected in parallel to the data acquisition unit 16 and transmit information to the data acquisition unit 16. The piezo-electric element in the hydrophone 18 produces an electrical signal based on pressure changes in the environment in step 216 and sends the signal to the data acquisition unit 16. The accelerometers 20 are in a neutrally buoyant state; they produce an electrical signal based on any changes in speed or direction of the surrounding water in step 218 and transmit the signal to the data acquisition unit 16.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. For example, statements of intended use are illustrative rather than limiting. Also, while three accelerometers are disclosed, more or fewer could be used instead; for example, if only one-dimensional detection is required, only one accelerometer need be provided. Therefore, the present invention should be construed as limited only by the appended claims.

I claim:

1. A method for calibrating a sensor, the sensor having a piezoelectric hydrophone and at least one accelerometer, the method comprising:
   (a) providing a source of a known electrical signal;
   (b) connecting the source of the known electrical signal to the hydrophone to cause the hydrophone to emit a signal;
   (c) detecting the signal emitted by the hydrophone in the at least one accelerometer to produce an accelerometer output signal;
   (d) comparing the known electrical signal to the accelerometer output signal to provide a comparison; and
   (e) calibrating the sensor in accordance with the comparison provided in step (d).

2. The method of claim 1, wherein the sensor comprises a plurality of accelerometers, and wherein steps (c), (d) and (e) are performed for all of the plurality of accelerometers.

3. The method of claim 1, wherein step (b) is performed by using a switch that selectively connects the source of the known signal to the hydrophone.

4. The method of claim 3, wherein the switch is configured to connect the hydrophone selectively to the source of the known signal or to a data acquisition unit.

5. A sensor system comprising:
   a sensor unit that comprises a piezoelectric hydrophone and at least one accelerometer;
   a source of a known electrical signal;
   a data acquisition unit;
   a circuit for connecting the at least one accelerometer to the data acquisition unit; and
   a switch for connecting the piezoelectric hydrophone selectively to the source of the known electrical signal or to the data acquisition unit.

6. The sensor system of claim 5, wherein the sensor unit comprises a plurality of accelerometers, all of which are connected to the data acquisition unit through the circuit.

7. The sensor system of claim 6, wherein the data acquisition unit is programmed such that, when the switch connects the piezoelectric hydrophone selectively to the source of the known electrical signal, the data acquisition unit compares the known electrical signal to an output of the at least one accelerometer to calibrate the at least one accelerometer.

8. A method for calibrating and using a sensor, the sensor comprising a piezoelectric hydrophone and at least one accelerometer in a housing, the method comprising:
   (a) providing a source of a known electrical signal;
   (b) providing a data acquisition unit;
   (c) connecting the piezoelectric hydrophone to the source and the data acquisition unit through a switch such that the piezoelectric hydrophone is selectively connected either to the source or to the data acquisition unit by switching of the switch;
   (d) connecting the at least one accelerometer to the data acquisition unit;
   (e) switching the switch such that the piezoelectric hydrophone is connected to the source;
   (f) causing the piezoelectric hydrophone to emit a signal in accordance with the known electrical signal;
   (g) detecting the signal emitted by the hydrophone in the at least one accelerometer to produce an accelerometer output signal;
   (h) comparing the known electrical signal to the accelerometer output signal to provide a comparison;
   (i) calibrating the at least one accelerometer in accordance with the comparison provided in step (h);
   (j) switching the switch such that the piezoelectric hydrophone is connected to the data acquisition unit; and
   (k) detecting motion and pressure changes by using the piezoelectric hydrophone and the at least one accelerometer.

9. A sensor system comprising:
   a piezoelectric hydrophone;
   at least one accelerometer;
   a housing containing the piezoelectric hydrophone and the at least one accelerometer;
   a source of a known electrical signal;
   a data acquisition unit;
   a switch, connected to the piezoelectric hydrophone, for connecting the piezoelectric hydrophone to the source and the data acquisition unit such that the piezoelectric hydrophone is selectively connected either to the source or to the data acquisition unit by switching of the switch;

a circuit for connecting the at least one accelerometer to the data acquisition unit; and means, in communication with or provided in the data acquisition unit, for:

(a) calibrating the at least one accelerometer when the switch connects the piezoelectric hydrophone to the source to cause the piezoelectric hydrophone to emit a signal in accordance with the known electrical signal by detecting the signal emitted by the hydrophone in the at least one accelerometer to produce an accelerometer output signal, comparing the known electrical signal to the accelerometer output signal to provide a comparison and calibrating the at least one accelerometer in accordance with the comparison; and (b) detecting motion and pressure changes by using the piezoelectric hydrophone and the at least one accelerometer when the switch connects the piezoelectric hydrophone to the data acquisition unit.

* * * * *